United States Patent [19]

Trame et al.

[11] Patent Number: 5,257,762
[45] Date of Patent: Nov. 2, 1993

[54] NEON TUBE SUPPORT HAVING MOLDED SPRING AND METHOD OF MAKING THE SUPPORT

[75] Inventors: Charles E. Trame, Mequon; Mark A. Fredricks, Elm Grove, both of Wis.

[73] Assignee: Everbrite, Inc., Greenfield, Wis.

[21] Appl. No.: 569,429

[22] Filed: Aug. 20, 1990

[51] Int. Cl.5 .............................................. F16L 3/20
[52] U.S. Cl. ...................... 248/50; 248/74.2; 267/178
[58] Field of Search ............. 248/50, 623, 600, 624, 248/74.2; 267/178, 170, 166

[56] References Cited

U.S. PATENT DOCUMENTS

| | | |
|---|---|---|
| 2,378,426 | 9/1948 | Reinhart et al. ............ 267/149 X |
| 2,456,302 | 12/1948 | Mocnik ....................... 267/178 |
| 2,545,416 | 3/1951 | Staaf ............................. 248/50 |
| 3,378,426 | 4/1968 | Medney ..................... 267/149 X |
| 4,637,492 | 1/1987 | Herr ......................... 248/221.4 X |
| 4,666,109 | 5/1987 | Fallon et al. .................... 248/50 |
| 4,773,633 | 9/1988 | Hinz et al. ................. 267/166 X |

Primary Examiner—Alvin C. Chin-Shue
Attorney, Agent, or Firm—Ryan, Kees & Hohenfeldt

[57] ABSTRACT

A unitary helical coil spring assembly is inserted in a tubular body to form a neon tube support. The assembly is molded of plastic using a mold comprised of two planar blocks in each of which there are a series of axially spaced apart recesses configured to form half convolutions of a spring and there are projections having rounded ends projecting from between half convolution recesses on each mold block which interdigitate and project into the half convolution recesses in the opposite mold block when the planar surfaces are interfaced so the rounded ends cooperate to form a circular inside diameter of the spring when plastic is injected in the recesses.

12 Claims, 2 Drawing Sheets

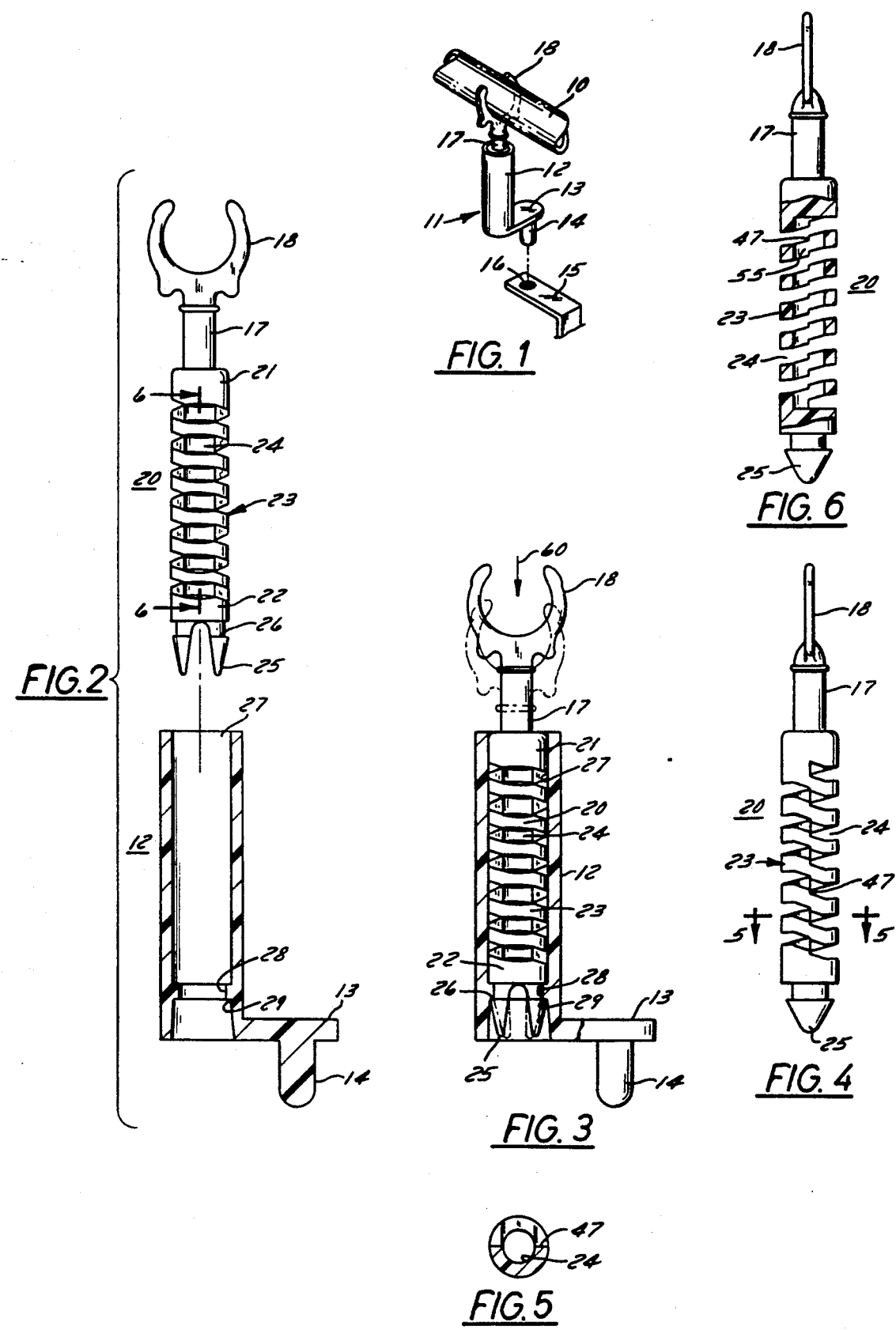

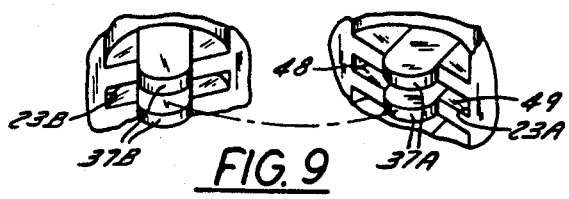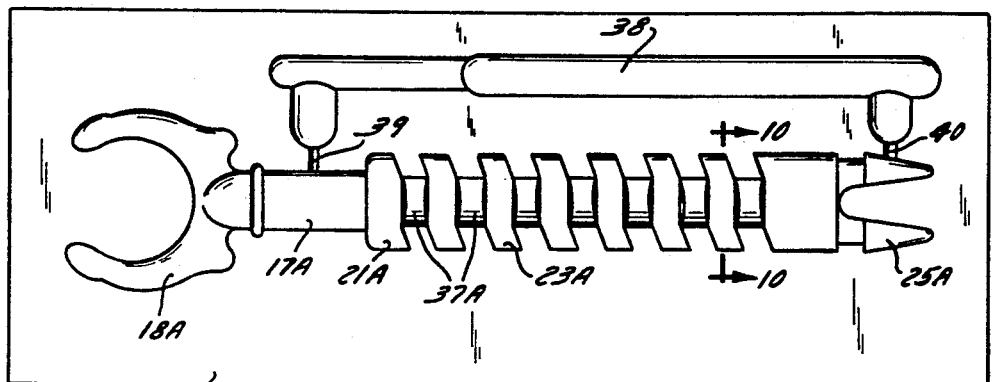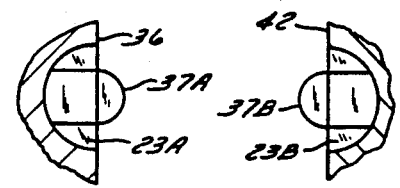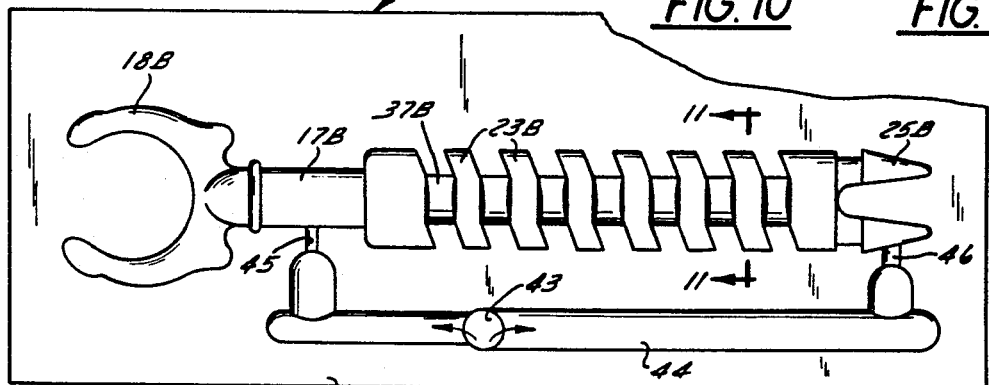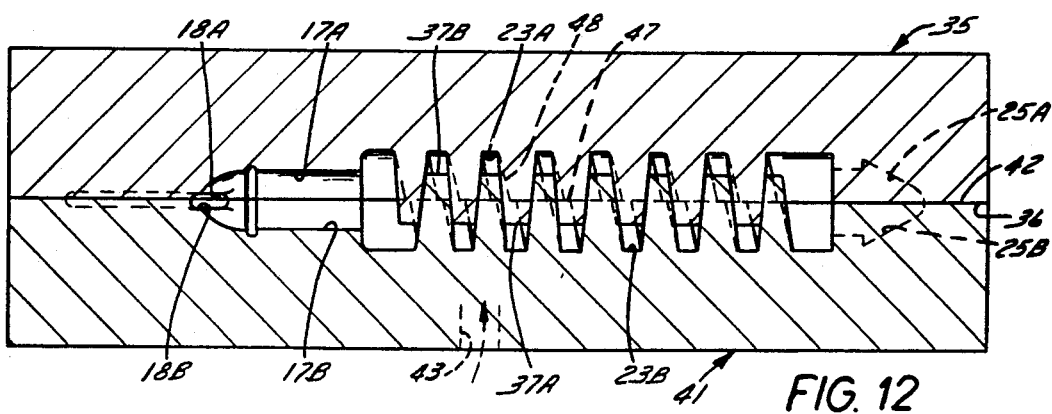

NEON TUBE SUPPORT HAVING MOLDED SPRING AND METHOD OF MAKING THE SUPPORT

BACKGROUND OF THE INVENTION

The invention disclosed herein pertains to display devices such as are commonly known as neon signs and, in particular, to resilient supports for the gas filled glass tubing used in such signs.

Neon signs comprise glass tubes which are bent into various configurations and have electrodes sealed into their opposite ends. The color of the light which is emitted when a high electric potential is applied across the electrodes depends on the particular inert gas with which the tube is filled. Argon, krypton and neon are the most commonly used gases, but for the sake of brevity, all light emitting gas filled tubes to which the new tube support is applicable will be called neon tubes herein.

Neon signs customarily comprise frames or panels on which the configured gas filled glass tube is supported by means of standoffs or insulating supports. These supports are designed to hold the neon tubing in a fixed position and also to act as shock absorbers which function to allow the neon filled glass tubing to flex a little rather than fracture when the sign is subjected to a distorting or a vibrational force.

Neon signs are typically comprised of a base on which the tube supports are mounted in a pattern that conforms to the configuration of the neon tube. Commonly used prior art supports are comprised of a cylindrical body, usually of metal, which has an axial bore and contains a coaxial metal helical coil spring having one end engaged with the body in the nominally bottom end of the bore. A stem enters the bore coaxially with the spring. One end of the stem connects with the spring like a spring biased plunger and the other end of the stem extends from the cylindrical body. This end of the stem may terminate in an integral c-shaped element which can engage the neon tube for supporting it effectively on the spring. Sometimes there are notches on the part of the stem which extends from the cylindrical body for facilitating using a tie wire to positively secure the neon tube to the stem.

Commercially available neon tube supports are more costly than one might assume after inspecting them. Much of the costs results from having to make the parts, including the cylindrical body, the stem and spring separately and then undertake at least a two step assembly operation before a tube support is ready for use.

Designers and users of tube supports have striven to reduce costs with various implementations of the basic tube support outlined above. None of the designs are optimized for high production rates and lowest cost. The economic benefit that could be achieved with an optimized design is substantial. There are major neon sign manufacturers which use at least two hundred thousand tube supports per week every week of the year. The annual savings that can result from reducing the cost or price of the tube supports by one cent (U.S.) can amount to over $200,000 (U.S.) per year for such manufacturer. The new tube support disclosed herein saves substantially more than one cent per support as compared with the lowest cost tube support of which applicants are aware.

Initially, applicants perceived that an all plastic tube support, including the spring, could be a very low cost design. Conventional molds and molding practices were tried. A metal pin was used to core out the helical spring. It turned out that, since the core pin is trapped within the spring, it acquired heat from the hot molten plastic each time a mold or cast was made but it could not give up enough heat between molding cycles to prevent prolonging the amount of time that the molding material remained fluid due to heat derived from the core pin. This resulted in less than optimum productivity. Applicants then conceived a molding method which provides for making all parts of the support of plastic, eliminating the need for a core pin, making a plastic spring practical, and achieving high production rates.

SUMMARY OF THE INVENTION

An achieved objective of the present invention is to reduce the cost of producing tube supports by utilizing a new design which provides for molding the neon tube support spring and tube supporting stem as an integral or unitary plastic part.

Another achieved objective is to provide a special mold design and method of molding which provides for molding the plastic helical spring of the neon tube support without using a core pin in the mold to define the bore of the spring so as to avoid the delay which would occur as a result of having to wait for a core pin to cool before the next integrated or unitary spring and stem assembly could be molded. Thus, if the waiting time saved per molding cycle amounts to only a few seconds where use of a heatable metal core pin is avoided, the time saved incidental to a multimillion piece production run can be impressively significant.

Briefly stated, the invention involves using two blocks comprising a two part mold for molding the unitary spring and stem assembly where each half of the mold has a plurality of axially spaced apart recesses defining half convolutions of the spring in it. Each block or half of the mold has radially inwardly extending core projections which are offset axially and thus interdigitate with the projections on the opposite mold half when the two halves are brought together for having the melted plastic injected into the mold cavity which then provides a continuous helically proceeding spring cavity and contiguous stem cavity so the melted plastic can flow to every part of the mold. The projections coming in from opposite sides into the mold cavity have rounded ends so they coact to form the circular inside diameter center or core of the spring which is devoid of plastic as if it were a wound spring. Because the projections are axially offset, the halves of the spring convolution recesses in the mold are also offset at the parting faces of the mold blocks so the melted plastic can flow lengthwise of the mold cavity by crossing over from one half convolution to the next one.

How the foregoing and other more specific objectives of the invention are achieved will be evident in the ensuing more detailed description of a preferred embodiment of the spring and stem assembly and of the mold for making the unitary assembly will now be set forth in reference to the drawings.

DESCRIPTION OF THE DRAWINGS

FIG. 1 is a perspective view of a fragment of a glass neon tube being supported by the new tube support;

FIG. 2 is a vertical sectional exploded view of the cylindrical body of the tube support in combination with the unitary spring and stem, the latter of which is aligned with the cylindrical body for being inserted therein;

FIG. 3 is a sectional view of the cylindrical body with the unitary stem and spring inserted;

FIG. 4 is a side elevational view of the unitary spring and stem of the neon tube support;

FIG. 5 is a transverse section taken on a line corresponding with 5—5 in FIG. 4;

FIG. 6 is a vertical sectional view of the spring portion of the spring and stem assembly depicted in FIG. 4;

FIG. 7 is a plan view of one of the halves of a mold used to make the new unitary spring and stem of the tube support;

FIG. 8 is a plan view of the other of the halves of the mold which interfaces with the molded halve shown in FIG. 7;

FIG. 9 is a perspective view of the parts of the mold isolated from each of the mold halves in FIGS. 7 and 8;

FIG. 10 is a transverse sectional view of part of the mold cavity taken on a line corresponding with 10—10 in FIG. 7.

FIG. 11 is a transverse sectional view taken on a line corresponding to 11—11 in FIG. 8;

FIG. 12 is a sectional view through the mold after the two mold halves or blocks are brought together for being injected with a plastic material; and FIG. 13 is a half of a spring convolution.

DESCRIPTION OF A PREFERRED EMBODIMENT

FIG. 1 shows a fragment of a glass neon tube 10 being supported by the new tube support which is generally designated by the reference numeral 11. The support comprises a cylindrical body 12, preferably of plastic material, having a foot 13 from which an anchoring pin 14 extends. A part of a neon sign structure such as the angle bracket 15 is provided with a hole 16 into which the anchoring pin 14 is inserted to stabilize the tube support 11. There is a plastic stem 17 extending from cylindrical body 12. The stem has a c-shaped neon tube clamping member 18 molded integrally with it. The plastic of the c-shaped clamping member is resilient so it can spread open when it is being forced onto neon tube 10 after which it contracts to grip the tube. The general features of the tube support just outlined are conventional in themselves but the materials used for the support, the configuration of the parts that are internal to the cylinder 12 and the method of molding the support differ substantially from prior practice.

Attention is now invited to FIG. 2 which reveals that stem 17 is molded integrally with a helical spring 20. In this FIGURE the nominally upper end of the spring terminates in a solid imperforate cylindrical part 21 and the nominally bottom end also terminates in a solid, imperforate cylindrical part 22. A typical convolution of spring 20 is marked 23 and it should be noted that the convolutions have a distinctive shape when viewed in profile in that the convolutions have steps in them which are not ordinarily, if at all, present in wire wound helical springs. Molded plastic spring 20 has a central bore 24 which is substantially circular in cross-section as if the spring were a wound spring or had been molded with a core pin in the bore which is not actually the case as will be explained. The unitary spring and stem assembly has radially inwardly and outwardly springable prongs 25 integral with cylindrical part 22 at its nominally bottom end. These prongs are axially tapered and have shoulders 26 on them. The bore 27 of cylindrical body 12 of the neon tube support has a hole 28 in its lower end which is bounded by a shoulder 29. When the unitary spring and stem is pushed into cylinder 27, the tapered prongs 25 are squeezed together as they pass through hole 28 in body 12 and then they expand so that shoulders 26 of the prongs are disposed in interfering relationship with shoulders 29 to thereby secure the unitary stem and spring in cylindrical body 12.

Polycarbonate resin is the material out of which the unitary spring and stem 20 is molded in an actual embodiment. The grade of polycarbonate resin used is characterized by lacking brittleness and maintaining flexibility at low temperatures. These are minimum requirements for any plastic material of which the spring may be molded. The cylindrical body 12 may also be composed of polycarbonate resin but other plastic materials could also be used.

Before completing the description of the structural features of the new neon tube support, the manner in which the unitary spring 20 and stem 17 is molded will be explained in reference to FIGS. 7—13 to which attention is now invited.

As explained at the outset of this specification, it was discovered that high production rates for the tube supports could not be achieved if it is necessary to wait for a core pin, which forms a central bore 24 of the spring 20, to cool between each mold cycle so that the incoming molten plastic would not derive heat from the pin and maintain the plastic in a molten state in which case the mold could not be opened to extract the molded part without delay. The new unitary spring and stem assembly 20 is made without using a core pin for forming the bore of spring 20. FIG. 7 shows one half of a mold for molding the spring and stem assembly. The mold half comprises a metal block 35 which has a generally planar face 36. The mold block has a cavity including a recess 18A in its face for forming one half of the c-shaped neon tube clamp 18 which was mentioned in connection with the previously discussed FIGURES. There is a semi-cylindrical recess 17A for forming one half of the cylindrical stem 17 of the unitary spring and stem 20. There are a plurality of axially spaced apart convolution recesses 23A for forming halves of the spring convolutions 23. In FIG. 7 there are projections 37A which extend upwardly in the mold cavity from the plane of the drawing. FIG. 9 is an isolated section showing two of the projections 37A to have circular ends which accounts for the circularity of the bore 24 of the spring which was previously mentioned. Mold block 35 has a runner 38 constituting a groove which is semicircular in cross-section and provides for conducting molten resin into the mold cavity when this half or block 35 of the mold is brought into interfacing relationship with mating mold block 41 in FIG. 8. In FIG. 7 the injected molten polycarbonate resin is admitted into the mold cavity for the spring and stem by way of small orifices or gates 39 and 40. The mating mold block 41 in FIG. 8 is basically similar to the mold block 35 in FIG. 7 except that the recesses 23B for forming the one half of the convolution 23 are axially offset by about the width of one convolution relative to the half convolution recesses 23A in FIG. 7. Similarly, in FIG. 8 the projections 37B between convolution recesses 23B for the convolutions 23 are offset axially by about the width of a spring convolution so that the projections 37A in the FIG. 7 half of the mold project into the central part of the half convolution recesses 23B in FIG. 8 and the projections 37B in FIG. 8 extend into the central part of the recesses 23A in FIG. 7. The positioning of the projections and the convolution recesses is such that when the mold halves of FIGS. 7 and 8 are brought into interfacing relationship for injection molding, there can be a continuous axial flow of melted resin along the helical path defined by the basically semicircular convolutions 23A and 23B over the entire length of the spring. Because of the axial offset of the projections 37A and convolutions 23A on one mold half relative to projections 37B and convolutions 23B on the other mold half, a passageway remains in the mold around projections so the round ended or semicircular interdigitated projections cooperate to produce the circular bore 24 in spring 23. It will be evident, of course, in FIG. 8 that there is an inlet port 43 for the injected plastic and it is distributed by means of a runner 44 which is semicircular in cross-section and forms a circular passageway when the mold halves of FIGS. 7 and 8 are brought into interfacing relationship so that runner 44 becomes congruent with runner 38. Runner 44 has small outlet ports 45 and 46 for admitting the melted resin into the mold cavity. The semicircular recesses 17B and the recess 18B for the stem 17 and c-clamp 18, respectively, become congruent with cavities 17A and 18A in FIG. 7 when the blocks or mold halves 41 and 35 are interfaced. And as implied earlier, the prongs 37A and 37B become interdigitated when the mold halves are interfaced.

FIG. 12 shows the two blocks or mold halves 35 and 41 arranged in interfacing relation as they are when the melted resin is being injected. This vertical section through the mold is taken on a plane which is perpendicular to the flat interfacing surfaces 36 and 42 of blocks 35 and 41, respectively. One half of the spring remains in the molds. Here one may see that the projections 37A and 37B, which project from the opposite mold halves, are tapered and shaped with an offset 47 which results in a low plane 48 being formed on projection 37A and a riser or high plane 49 being formed on the other side of the offset. This offset from one half of the convolution to the next one is necessary to provide for axial flow of the hot melted resin from one end of the spring to the other in the mold. As is evident in FIG. 12 considered in conjunction with FIG. 6, if an imaginary plane coincident with the faces were cut diametrally through the mold, the offsets where the half convolutions from one mold block join with the half convolutions from the other mold block occur coincident with this imaginary plane. Offsets such as the one marked 47 in FIG. 6 are not found in a typical wire wound helical spring but they are necessary in the coreless mold described herein for mentioned purposes and for obtaining pitch between convolutions when there is nothing but the projections in the bore of the spring to prevent the melted resin from flowing into the center or bore of the spring. It is important to recognize that the projections 37A and 37B project from rather massive mold sections which are good heat sinks and are subject to water cooling when installed in a molding machine, not shown. Hence, the projections cool much faster than a core pin in the spring could cool so the molds can be opened sooner to remove a solidified spring and stem 20.

Referring to FIGS. 9 and 13, one may see that the projections 37A are contiguous with flat surfaces 48 and 49 which are offset from each other or lie in slightly different planes to define one side of the convolution which is formed in the gap or cavity marked 23A in FIG. 9. Flat surfaces 48 and 49 which lie in different planes provide for the offsets 47 in FIG. 12 and allow for crossover or flowthrough of melted plastic from one spring convolution to another in the mold.

FIG. 4 shows the unitary plastic spring and stem isolated from cylinder 12 and rotated 90° from its position in FIG. 2. FIG. 5 is a transverse section through the spring portion 20 of the assembly in FIG. 4 for illustrating that one half of a convolution of the spring 23 lies in a different plane than the opposite continuous half thereof.

FIG. 3 shows the spring and stem assembly inserted in cylindrical body 12. In the bottom region the dash-dot lines show how the tapered projections 25 deflect inwardly when the spring is pressed into cylinder 12 and the solid lines show how the projections spring radially outwardly for the shoulders 26 to expand to the position where the shoulder on 29 on cylinder 12 interferes with removal of the spring from the cylindrical body 12. The spring 20 in FIG. 3 can be compressed axially of cylindrical body 12 by the weight of a neon tube in c-shaped clamps 18 acting in the direction of the arrow 60 so that the spring, stem and c-shaped clamp 18 can yield to a position wherein the clamp is depicted in phantom lines. The spring 20 can be twisted somewhat if necessary to get c-shaped clamp 18 to align with a neon tube that is gripped by it.

Although a preferred embodiment of the new neon tube support and the mold and method of making the same have been described in detail, such description is intended to be illustrative rather than limiting, for the invention may be variously embodied and is to be limited only by interpretation of the claims which follow.

We claim:

1. A neon tube support including a tubular body having an axial bore and an axially extending helical coil spring composed of plastic material adapted to fit into said bore for said spring to support a neon tube, said helical coil spring comprising:

a plurality of generally continuous convolutions of plastic material constituting a helical coil spring having opposite ends and a central axis surrounded by the convolutions, an axially extending imaginary diametral plane which passes through said helical coil spring coincident with said axis divides said convolutions into a plurality of semiconvolutions on opposite sides of the plane, semiconvolutions on one side of said diametral plane being offset in the axial direction relative to semiconvolutions on the opposite side of said diametral plane when said semiconvolutions join at said diametral plane to form said helical coil spring, a stem extending axially and unitarily from said helical coil spring and means on said stem for engaging a neon tube to support the tube on the helical coil spring.

2. The neon tube support according to claim 1 wherein said stem is unitary with said helical coil spring at one of said ends of the spring.

3. The neon tube support according to claim 1 wherein said plastic material is polycarbonate resin.

4. The neon tube support according to claim 2 wherein said unitary helical coil spring and stem are composed of polycarbonate resin.

5. The neon tube support according to claim 1 wherein said opposite ends of said helical coil spring have axially imperforate end portions, respectively, and said stem extends integrally and axially from one of said end portions.

6. The neon tube support according to claim 1 including axially imperforate end portions integral with said helical coil spring at said opposite ends thereof, said stem extending integrally from one of said imperforate end portions.

7. A neon tube support including a tubular body having an axial bore and an axially extending helical coil spring composed of plastic material adapted to fit into said bore for said spring to support a neon tube, said helical coil spring comprising:
- a plurality of generally continuous convolutions of plastic material constituting a helical coil spring having opposite ends and a central axis surrounded by the convolutions,
- an axially extending imaginary diametral plane which passes through said helical coil spring coincident with said axis divides said convolutions into a plurality of semiconvolutions on opposite sides of the plane,
- semiconvolutions on one side of said diametral plane being offset in the axial direction relative to semiconvolutions on the opposite side of said diametral plane when said semiconvolutions join at said diametral plane to form said helical coil spring,
- a stem extending axially and unitarily from said helical coil spring and means on said stem for engaging a neon tube to support the tube on the helical coil spring,
- axially imperforate end portions integral with said helical coil spring at said opposite ends thereof, said stem extending integrally from one of said imperforate end portions, and
- flexible axially tapered prongs extending unitarily from the imperforate end portion of said helical coil spring opposite of said imperforate end portion from which said stem extends, said prongs having shoulders formed thereon and said tubular body having an axial hole and a shoulder around the hole, said tapered prongs having space between them for allowing the prongs to flex radially inwardly when inserted through said hole and to flex radially outward after having passed into said hole for the shoulders on the prongs to engage with said shoulder around the hole.

8. The neon tube support according to claim 7 wherein said plastic material composing the helical spring is polycarbonate resin.

9. A neon tube support including a tubular plastic material body having an axial bore,
- a plurality of generally continuous convolutions of polycarbonate resin constituting a helical coil spring arranged coaxially in said axial bore of the tubular body,
- said coil spring having opposite first and second solid non-helical end portions unitary with the spring at opposite ends thereof, the first of said end portions being constructed for engaging said tubular body inside of said bore and the second of said end portions having a stem extending unitarily therefrom axially outwardly of the tubular body, and
- a generally C-shaped clamping member unitary with said stem for engaging a neon tube to support the tube on the plastic helical spring.

10. A neon tube support including a tubular body having an axial bore,
- a plurality of generally continuous convolutions of plastic material constituting a helical spring arranged coaxially in said bore of the tubular body,
- said spring having a first end portion and a second end portion opposite of the first end portion,
- a stem extending unitarily from said second end portion of the spring outwardly of the tubular body,
- a clamping member unitary with stem for engaging a neon tube to support the tube on said tube on the plastic helical spring, and
- said spring is adapted to engage said tubular body inside of said bore by means of prongs extending axially of said spring and integrally from the said first end portion of the spring, said prongs having space between them to provide for flexing toward each other when pressed into said tubular body and for expanding to engage said body after being pressed in.

11. The tube support according to claim 10 wherein said spring is composed of polycarbonate resin.

12. The tube support according to claim 10 wherein said spring, said end portions, said stem and said prongs are unitary with each other and are composed of polycarbonate resin.

* * * * *